United States Patent [19]
Merle

[11] Patent Number: 5,949,541
[45] Date of Patent: Sep. 7, 1999

[54] SPECTROPHOTOMETER SYSTEM

[75] Inventor: Cormic K. Merle, Rochester, N.Y.

[73] Assignee: Lucid, Inc, Henrietta, N.Y.

[21] Appl. No.: 09/028,729

[22] Filed: Feb. 24, 1998

Related U.S. Application Data

[60] Provisional application No. 60/043,864, Apr. 11, 1997.
[51] Int. Cl.$^6$ ........................................................ G01J 3/28
[52] U.S. Cl. ............................................ 356/328; 356/334
[58] Field of Search ..................................... 356/326, 328, 356/330–334

[56] References Cited

U.S. PATENT DOCUMENTS

| | | |
|---|---|---|
| 2,948,184 | 8/1960 | Johnson . |
| 3,216,315 | 11/1965 | Keller . |
| 3,334,956 | 8/1967 | Staunton . |
| 3,414,356 | 12/1968 | Cary . |
| 3,658,423 | 4/1972 | Elliott . |
| 3,658,424 | 4/1972 | Elliott . |
| 3,985,442 | 10/1976 | Smith et al. . |
| 4,012,145 | 3/1977 | Chabannes et al. . |
| 4,591,270 | 5/1986 | Ahlen . |
| 4,605,306 | 8/1986 | Kaffka et al. . |
| 5,227,625 | 7/1993 | Hetzler . |

FOREIGN PATENT DOCUMENTS

| | | |
|---|---|---|
| 33 26 868 A1 | 4/1984 | Germany . |
| 42 14 186 A1 | 11/1993 | Germany . |
| 54-51579 | 4/1979 | Japan . |
| 57-69220 | 4/1982 | Japan . |
| 61-272617 | 2/1986 | Japan . |
| WO 96/12166 | 4/1996 | WIPO . |

OTHER PUBLICATIONS

Werner, "Imaging Properties of Diffraction Gratings", Uitgeverij Waltman–Delft, Jan. 7, 1970.
Schroeder. "Optimization of Converging–Beam Grating Monochromators", Journal of the Optical Society of America, vol. 60, No.8, Aug., 1970, pp. 1022–1026.

*Primary Examiner*—K P Hantis
*Attorney, Agent, or Firm*—Harris Beach & Wilcox, LLP.

[57] ABSTRACT

In order to reduce the size of a spectrophotometer having a rotatable diffraction grating and to compensate for longitudinal chromatic aberration and to provide for triangular bandwidth (where the image of the entrance aperture through which the light to be analyzed enters the spectrophotometer is equal in width to the width of exit slit through which the spectral components of each band are passed to a photodetector) thereby enabling high, accurate resolution of spectral line locations and edges of colors to be obtained, the diffraction grating is pivoted about an axis laterally displaced from the grating in the tangential plane, which plane contains substantially all of the light paths in the spectrophotometer. The exit aperture rotates with the grating and has a displacement from the grating in a direction transverse to the direction of displacement of the pivot, which displacement may be in the sagittal plane of the spectrophotometer. The displacement of the exit aperture may be in the direction of the lines of the grating and the width of the exit aperture intercepts light from the entrance slit which is directed from the grating to a mirror having power such that the power of the grating and mirror is less than one. Then the image of the entrance aperture at the exit aperture is minimally displaced in the tangential plane thereby compensating for longitudinal chromatic aberration and the projection of the entrance aperture on the exit aperture stays approximately constant over each of the spectral bands, thereby providing the spectrophotometer with a triangular bandwidth characteristic. The triangular bandwidth characteristic may be maintained without sacrificing illumination intensity by utilizing a refractive element such as a prism which is rotatable with the exit aperture and the grating. The element is in the light path to the exit aperture.

10 Claims, 9 Drawing Sheets

SPECTROPHOTOMETER SYSTEM

This application claims the priority benefit of U.S. Provisional Application Ser. No. 60/043,864, filed Apr. 11, 1997.

DESCRIPTION

The present invention relates to spectrophotometers and particularly to a spectrophotometer system which may be miniaturized in size so as to facilitate portable, and hand held operation. It is a feature of the invention to provide a spectrophotometer having a rotatable diffraction grating with an optical arrangement that reduces longitudinal chromatic aberration resulting from grating rotation and which maintains a triangular bandwidth, such that light to be analyzed or measured which enters the spectrophotometer through an entrance aperture or slit and light which is imaged at the exit slit where the spectral measurements are made has what is known as triangular bandwidth, namely that the image of the width of the entrance aperture is equal to the apparent width of the exit aperture over the wavelength range which is being analyzed. In other words the mathematical convolution of the image of the width of the entrance slit with the exit slit may be plotted as a triangle for each band over the wavelength range of the spectrophotometer instrument.

Spectrophotometers having rotating diffraction gratings are subject to longitudinal chromatic aberration in that the image at the exit aperture (the object distance or the focus at the exit aperture) shifts longitudinally in the direction of the optical axis of the system with wavelength. International patent publication WO 96/12166 of Apr. 25, 1996, corresponding to U.S. patent application, Ser. No. 08/322,244 filed Oct. 12, 1994, which was issued on Apr. 21, 1998, U.S. Pat. No. 5,742,389 explains how the object distance of a rotating grating spectrophotometer system (the distance to the exit aperture) changes with wavelength, thereby causing longitudinal chromatic aberration. Chromatic aberration is reduced by the use of a lens which has a dispersion which compensates for the anamorphic magnification of the grating and shifts the distance of the image of the entrance aperture at the exit aperture (the virtual image).

Another approach for reduction of longitudinal chromatic aberration is presented in an article by Daniel J. Schroeder entitled "Optimization of Converging—Beam Grating Monochrometers" which appeared in the Journal of the Optical Society of America, Volume 60, Number 8, August, 1970 at Page 1022. Schroeder's approach is to use a mirror having a magnification such that the combined magnification of the grating and the mirror is less than one. Then the real image at the exit aperture has a displacement with respect to wavelength which is minimized. The Schroeder system has the exit aperture spaced from the grating in the same direction as the pivot axis, about which the grating rotates. In the Schroeder system, the exit aperture is stationary. Both the grating pivot and the exit aperture are in the tangential plane in the Schroeder system. Then, in order to obtain the compensation for chromatic aberration arising from the reduction in the anamorphic magnification of the grating by virtue of the mirror, the pivot spacing from the grating is such that the size of the spectrophotometer is not well adapted to portable and particularly hand-held operation. For example, a distance from the pivot to the center of the grating of the order of twenty centimeters (cm) is dictated by the optics, if longitudinal chromatic aberration at the exit aperture is to be reduced. Complex mechanisms also not suitable for miniaturized instruments have been proposed for moving an exit aperture to maintain the focus of the entrance aperture at the exit aperture. See, W. Werner, Imaging Properties of Diffraction Gratings, published by Uitgeverif Waltman, Delft, Holland, Jan. 7, 1970, Chapter 1, thereof.

Obtaining a triangular band width characteristic is desirable in that it provides sub-wavelength increment resolution in a spectrophotometer. In the event that the spectrum is divided into successive wavelength bands which are presented across the width of the exit aperture, a triangular bandwidth characteristic results in accurate resolution (location) of between the spectral lines, and spectral edges at the ends of color bands, which is desirable for measurement accuracy. Also, tracking at the exit aperture of wavelengths with changing wavelengths of the illumination at the entrance aperture requires a triangular bandwidth characteristic for accuracy. An effectively triangular band width characteristic is obtained in the spectrophotometer described in the above-referenced international publication through the use of a lens having varying dispersion over the wavelength range of interest such that the width of the image focused by the lens at the exit aperture stays essentially constant over the wavelength range.

It has been found, in accordance with the present invention, that both longitudinal chromatic aberration and an essentially triangular bandwidth characteristic may be obtained in a spectrophotometer that is adapted to be miniaturized, and does not require displacement of the pivot from the grating which would foreclose miniaturization by locating the exit aperture (a slit in a body of optically opaque material) so that the exit aperture is displaced laterally (and particularly vertically) from the grating. The exit aperture is mounted for pivotal movement with the grating but is vertically displaced, for example, by being in the sagittal plane of the optical system rather than the tangential plane along which the light travels between the grating and the entrance aperture. Also, a mirror having a power such that the magnification of the grating and the mirror is less than one is used. The light deflected from the grating is incident on the mirror and directed by the mirror to the exit aperture. A photodetector may be mounted in the back of the exit aperture to translate the light into an electrical signal for analysis as well as for controlling the operation of the spectrometer, for example, incrementally pivoting the grating. The exit aperture is arranged by tilting the exit aperture so that its width is at an angle, for example 45 degrees, to the grating or by refracting the light directed on the exit aperture from the mirror such that the projection of the image at the exit aperture stays approximately constant over the wavelength range. The use of a prism or other refractive element enables the exit aperture to intercept a larger area of the beam while maintaining the width presented to the projection of the beam essentially constant over the wavelength range.

Accordingly, it is an object of the invention to provide an improved spectrophotometer.

A more specific object of the invention is to provide an improved spectrophotometer having a grating mounted on an arm for pivoting about an axis spaced from the grating, the optics of which may be packaged in a space small enough to enable the spectrophotometer to be miniaturized.

It is a still further object of the present invention to provide a spectrophotometer having a grating pivotable about an axis offset from the grating wherein longitudinal chromatic aberration reduction and a triangular bandwidth characteristic are obtained.

The foregoing and other objects features and advantages of the invention, as well as presently preferred embodiments thereof, will become more apparent from a reading of the following description in connection with the accompanying drawings in which.

Figure 1:
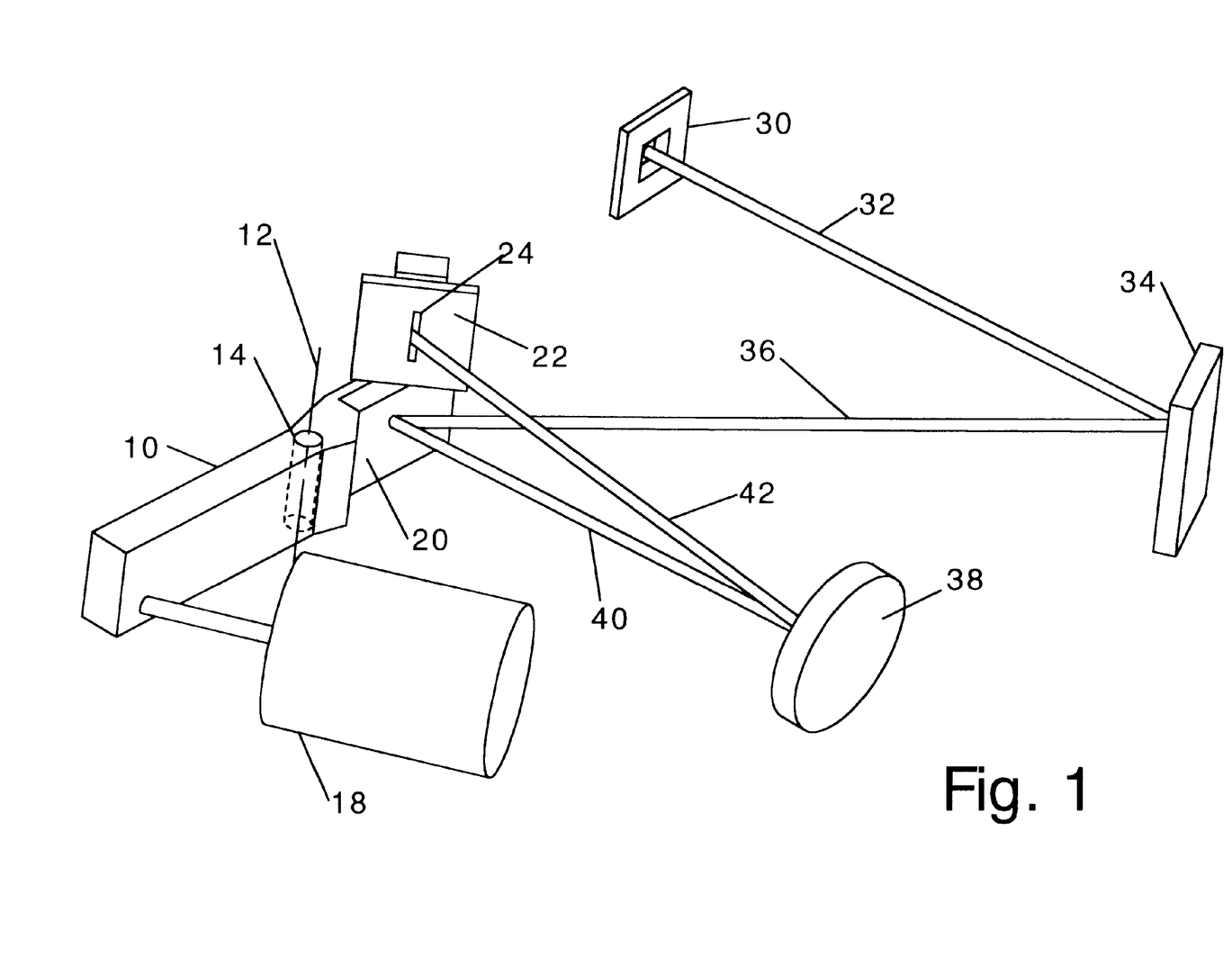
FIG. 1 is a perspective view of the mechanical and optical arrangement of a spectrophotometer embodying the invention.

Referring to FIG. 1, there is shown an arm 10 pivotal about an axis 12. The arm may contain a shaft (not shown) in a through hole 14 which is mounted in bearings in a housing 16 (FIG. 2) so as to enable the arm to pivot. Stops may limit the range of pivotal motion. Such stops are not shown in the figures for the sake of simplicity.

The arm 10 is actuated by a linear motor 18 which may be a stepping motor with a gear box which translates the rotational motion thereof into linear motion in steps. In this embodiment, the arm is pivoted in approximately thirty-five steps, each covering an approximately 10 nanometer band between the ends of a wavelength range of interest extending from 380 to 730 nm. The arm supports a diffraction grating 20, which may be blazed grating of the type used in spectrophotometers.

The grating lines in the illustrated embodiment extend vertically to provide deflection in the tangential plane. A plate 22 of opaque material having a rectangular exit aperture 24 (an aperture stop) is mounted so that the center of the plate, that is a line bisecting the width of the aperture, is centered over the grating. The distance from the grating is measured in the radial direction from the pivot to the center of the grating. A photodetector 26 is mounted behind the exit aperture 24 and exposed to illumination through the aperture 24. The exit aperture preferably flares or tapers outwardly from the front face of the plate 22, which is the face visible in FIG. 1, towards the rear face of the plate. Accordingly, the width of the plate 22 is not critical, but the plate should be of sufficient width to be self-supporting on the arm and also to support the photodetector 26. Alternatively, a bracket mounted on the arm may be used to support the plate 22 on the photodetector 26. The surface of the plate 22 is, as shown in FIG. 1, mounted at an angle of approximately 45 degrees to the face of the grating. The angle is selected so that the width of the slit, projected along the optical axis, is approximately the same and matches the width of the beam that illuminates the slit throughout the wavelength range of interest thereby providing the triangular bandwidth characteristic, discussed above.

Light from a sample 28, which may be illuminated either by reflection or transmission (see FIG. 2), enters the spectrometer housing 16 through an entrance aperture or slit 30 which may be square in shape. The aperture 30 forms the illumination into a beam. Other light guides may be used to prevent stray light from affecting the beam and for limiting the beam and absorbing any stray light. The beam from the entrance aperture 30 is called the entrance beam segment 32. That segment is incident on a folding mirror 34, which is preferably used in order to limit the width of the spectrophotometer and make it fit into the limited space in the housing 16. The beam 32 is deflected by the mirror 34 which has an orientation to direct the beam 32 into an intermediate beam segment 36 which is incident on the grating 20. The grating preferably operates in first order diffraction and deflects the beam to a concave mirror 38. The diffracted beam path segment is shown at 40. The mirror 38 has power and focuses, while deflecting, the beam to the center of the exit aperture 24. The deflected and focused beam from the mirror 38 extends over the beam path segment 42. The power of the mirror selected such that the anamorphic power of the grating taken together with the power of the mirror is less than one.

Figure 2:
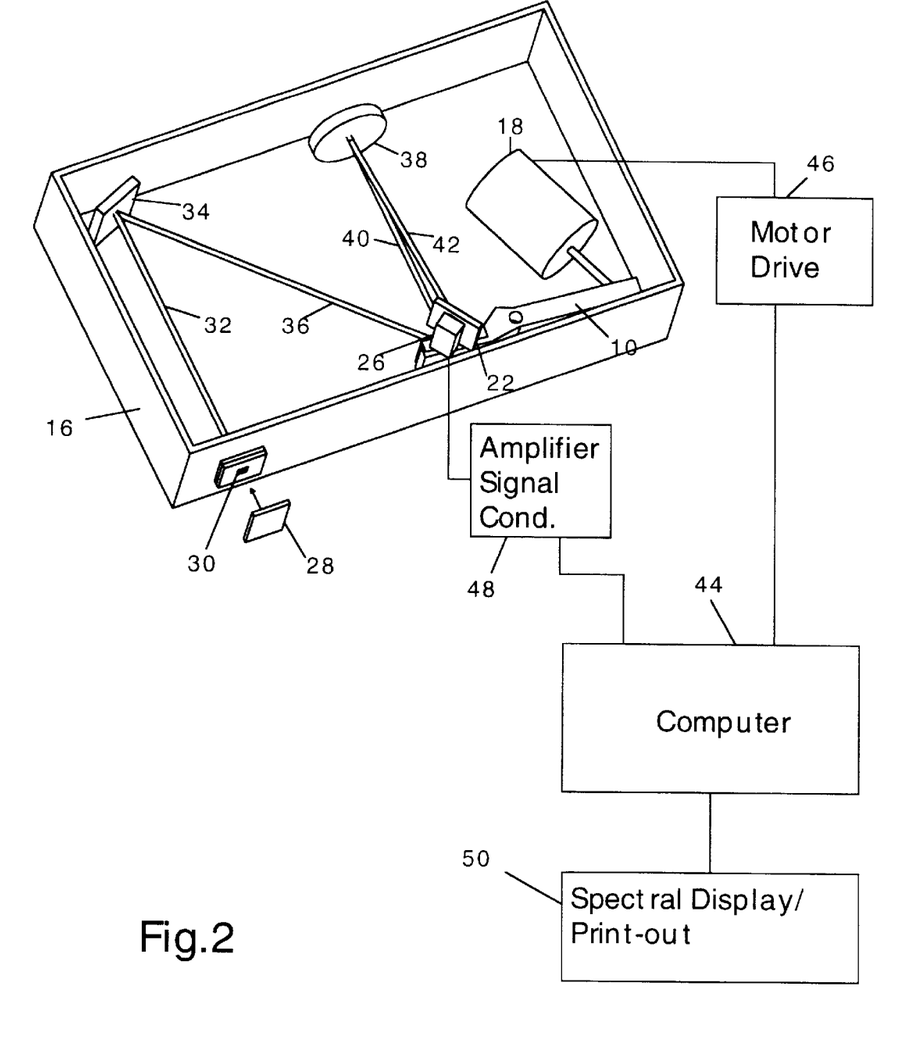
FIG. 2 is a schematic diagram showing a housing containing the mechanical and optical components of the spectrophotometer which appear in FIG. 1 and electrical analysis and control components of the spectrophotometer system.

A microprocessor based computer 44 provides a control and spectral analysis device for the spectrophotometer system. The computer controls the stepping motor 18 so as to cover the spectral bands. The motor drive pulses are obtained from the computer 44 and applied to the motor 18 via a motor drive circuit 46. The photodetector 26 is connected to a signal conditioning circuit, which may include an amplifier 48, and which provides an analog signal to the computer 44. The computer may have an internal analog to digital converter to provide corresponding digital signals which control the motor 18 via the motor drive and also output the spectralmeasurements to a spectral display or printout (printer) 50.

Figure 3A:
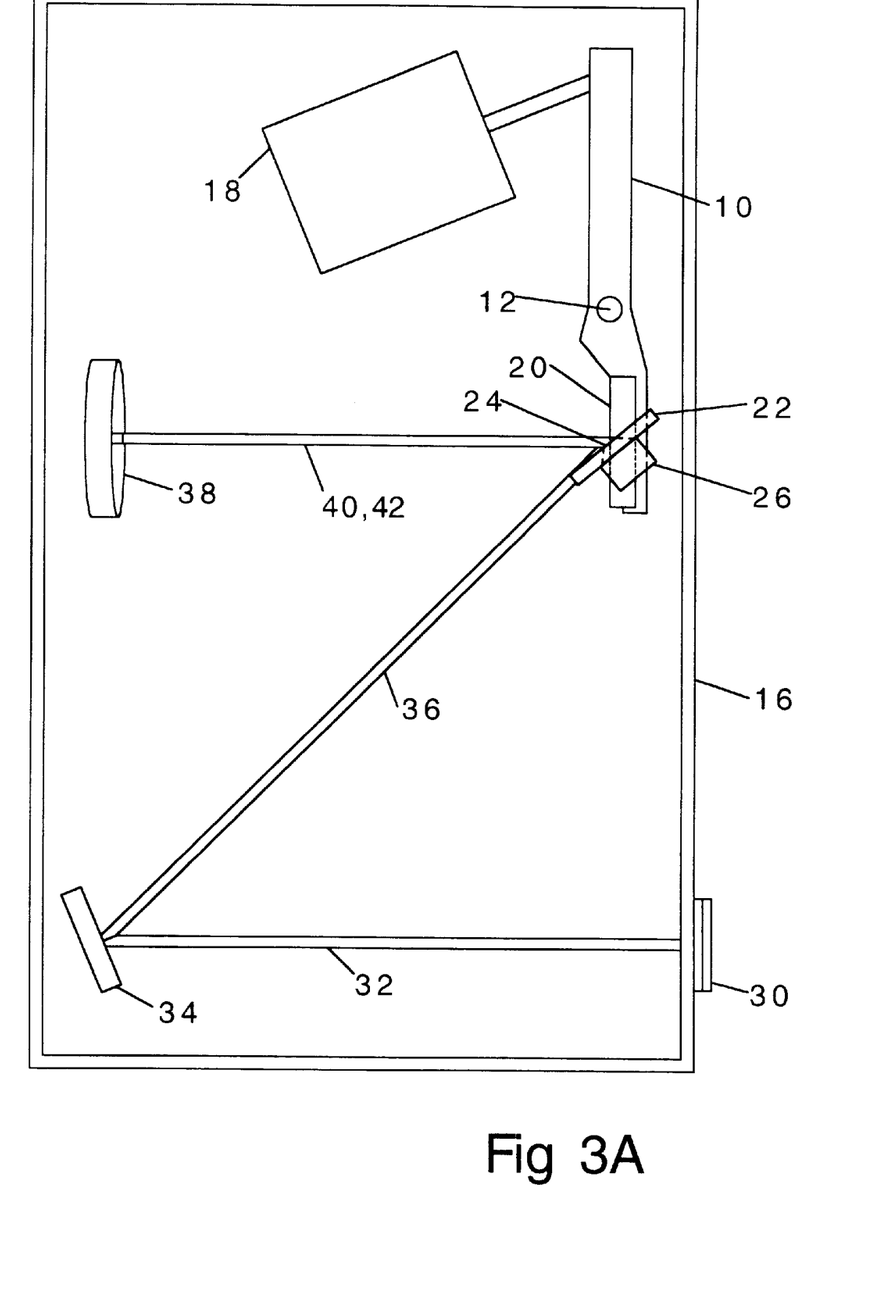
FIG. 3A is a plan view of the spectrophotometer system shown in FIG. 1 with the grating and the exit aperture at the center of the wavelength range of the spectrophotometer.
Figure 3B:
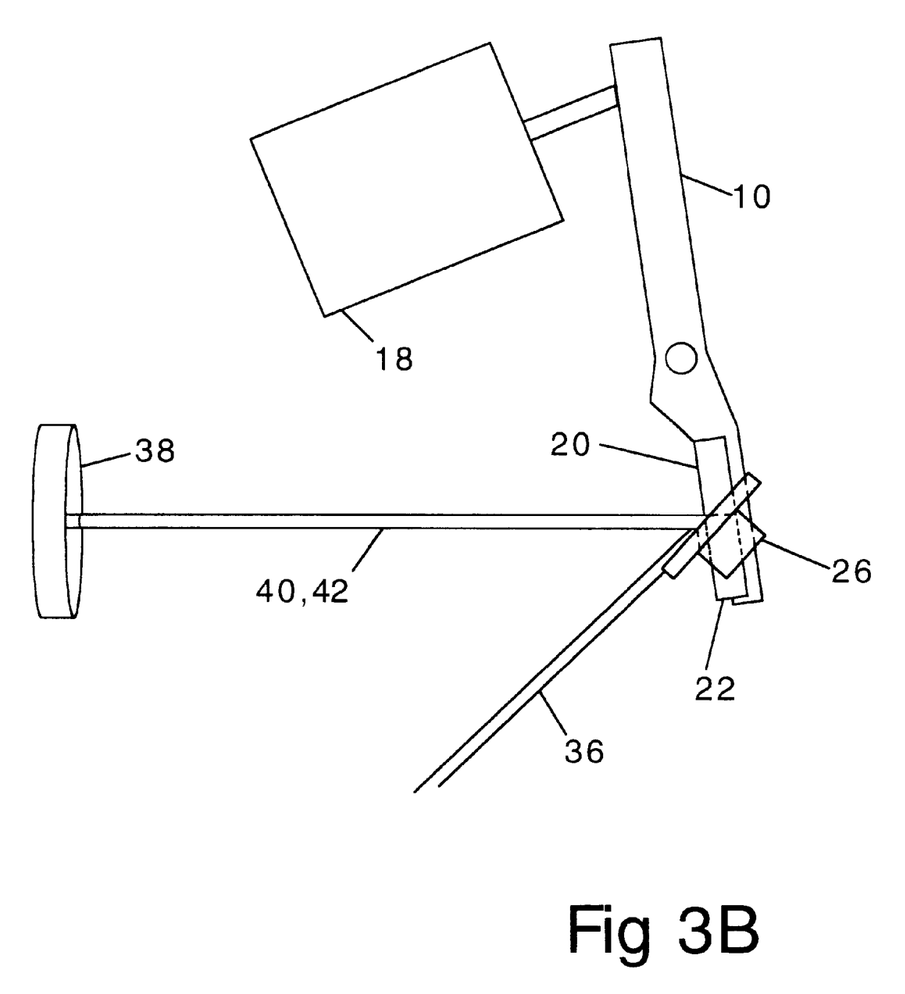
FIGS. 3B and 3C are fragmentary plan views, like FIG. 3A, views showing the grating and spectrophotometer of the system of FIG. 3A at the opposite ends of the spectral range of the spectrophotometer, for example, 380 nm in FIG. 3B and 730 nm in FIG. 3C.
Figure 3C:
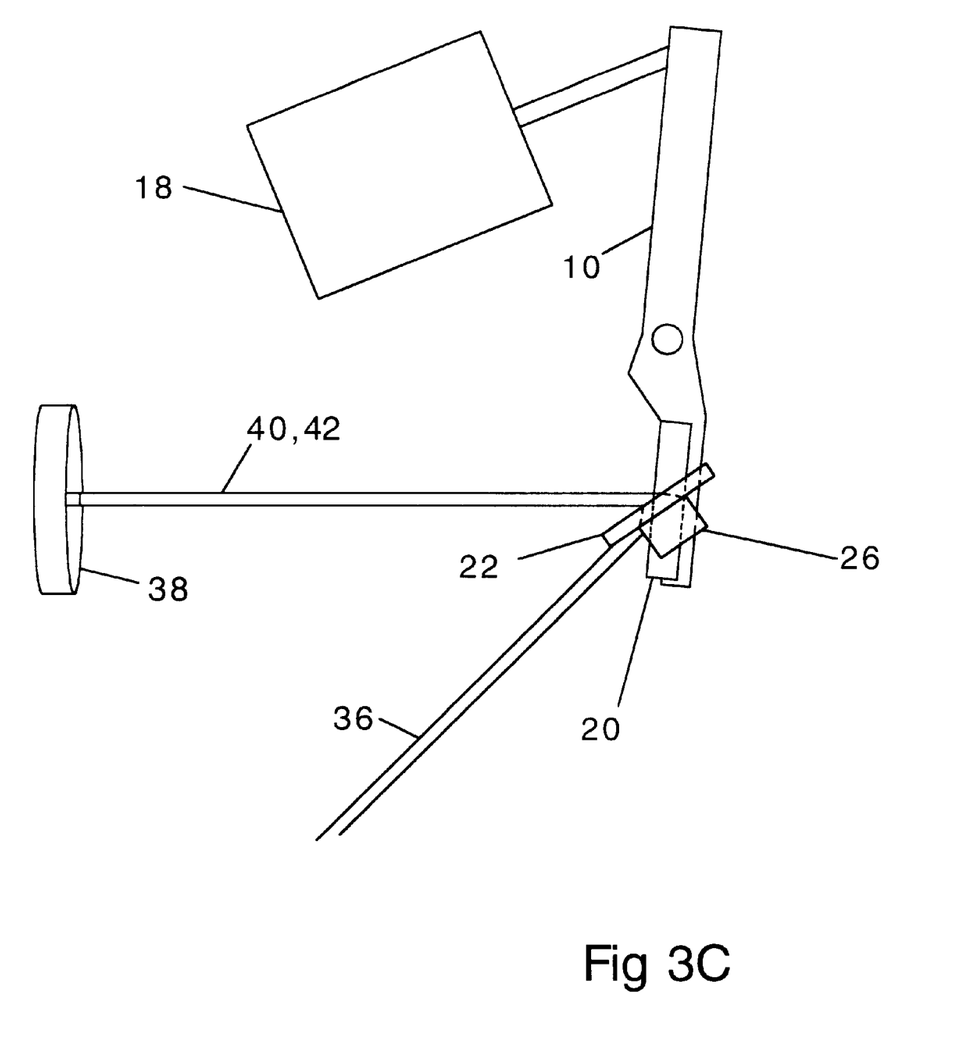

Referring to FIGS. 3A, B and C, it will be apparent that the aperture stop is directly above the grating 20 so that the front side or entrance at the center of the slit providing the aperture 24 (the bisector of the slit) approximately bisects the front face of the grating. Also, at the center of the wavelength range as shown in FIG. 3A, the front face is tilted with respect to the beams at an angle approximately midway between the angle of tilt at the lower end of the band shown in FIG. 3B and the upper end of the band as shown in FIG. 3C. The total angular change between the opposite ends of the bands may be approximately fourteen degrees centered at forty-five degrees. The grating is approximately perpendicular to the beams, that is the angle of incidence of the beams is ninety degrees to the grating face in the tangential plane. At the lower end of the band as shown in FIG. 3B, the arm is tilted by approximately eight degrees from its center position and at the upper end of the band, the arm is tilted by approximately six degrees from its center position. The difference from symmetry at the lower and upper end of the bands is due to the selection of the wavelengths. It will be appreciated that the angles and tilts will be different for different pivot locations, different grating pitches and different power in the grating and in the mirror 38.

Figure 3D:
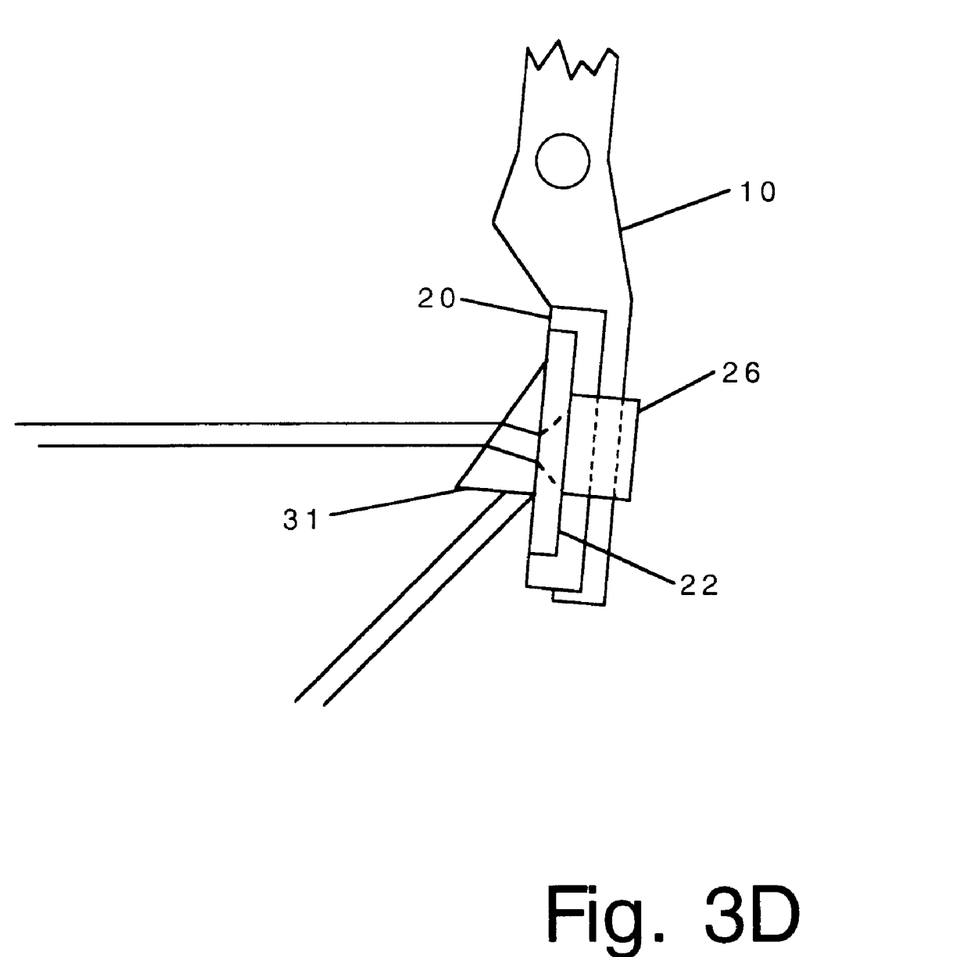
FIG. 3D is a fragmentary view illustrating the pivotal arm, grating, exit aperture and the photodetector shown in FIG. 3A and having a refractive element (a prism) for deflecting the light so that the triangular bandwidth characteristic of the spectrophotometer can be maintained, the exit aperture then collecting more light from the beam which is imaged at the exit aperture than in the case in the spectrophotometer shown in FIGS. 3A, B & C.

Referring to FIG. 3D, there is shown an optical arrangement where the face of the aperture 24 is in the same plane or a plane parallel to the face of the grating 20. A refractive element, namely a prism 31, is used to maintain equal or matched projected widths of the beam incident on the aperture as was the case with the tilted aperture plate, as shown in FIGS. 1 through 3C. Refractive power of the prism may also be selected so that the widths of the projected beam presented to the aperture over the wavelength increments or bands (the thirty-five bands in the embodiment extending from 380 to 730 nm) are about equal. Deviation from the 10 nanometer bandswidths is less in the case of the use of a prism than with the tilted aperture plate shown in FIGS. 3A–C.

Figure 4:
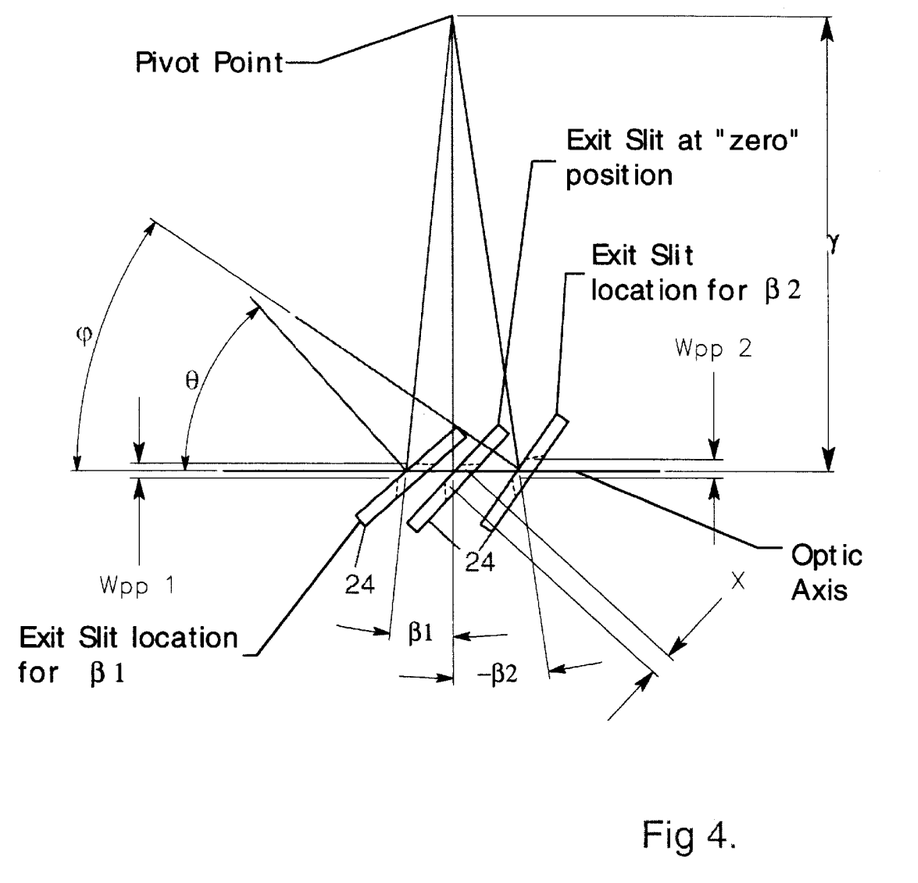
FIG. 4 is a schematic diagram illustrating the different angular orientations or tilts of the exit aperture at the center and at opposite ends of the wavelength range and showing how the effective size of the width of the exit aperture changes so as to maintain the triangular bandwidth characteristic.

FIG. 4 shows the affect on the width of the beam which is intercepted by the aperture slit at the center of the frequency range of interest and at the opposite ends of the range. It will be seen that the geometry effectively foreshortens the projection and makes the width shorter at the upper than at the lower end of the band. This change in width provides the triangular band width characteristics which is desirable in the spectrophotometer.

Figure 5:
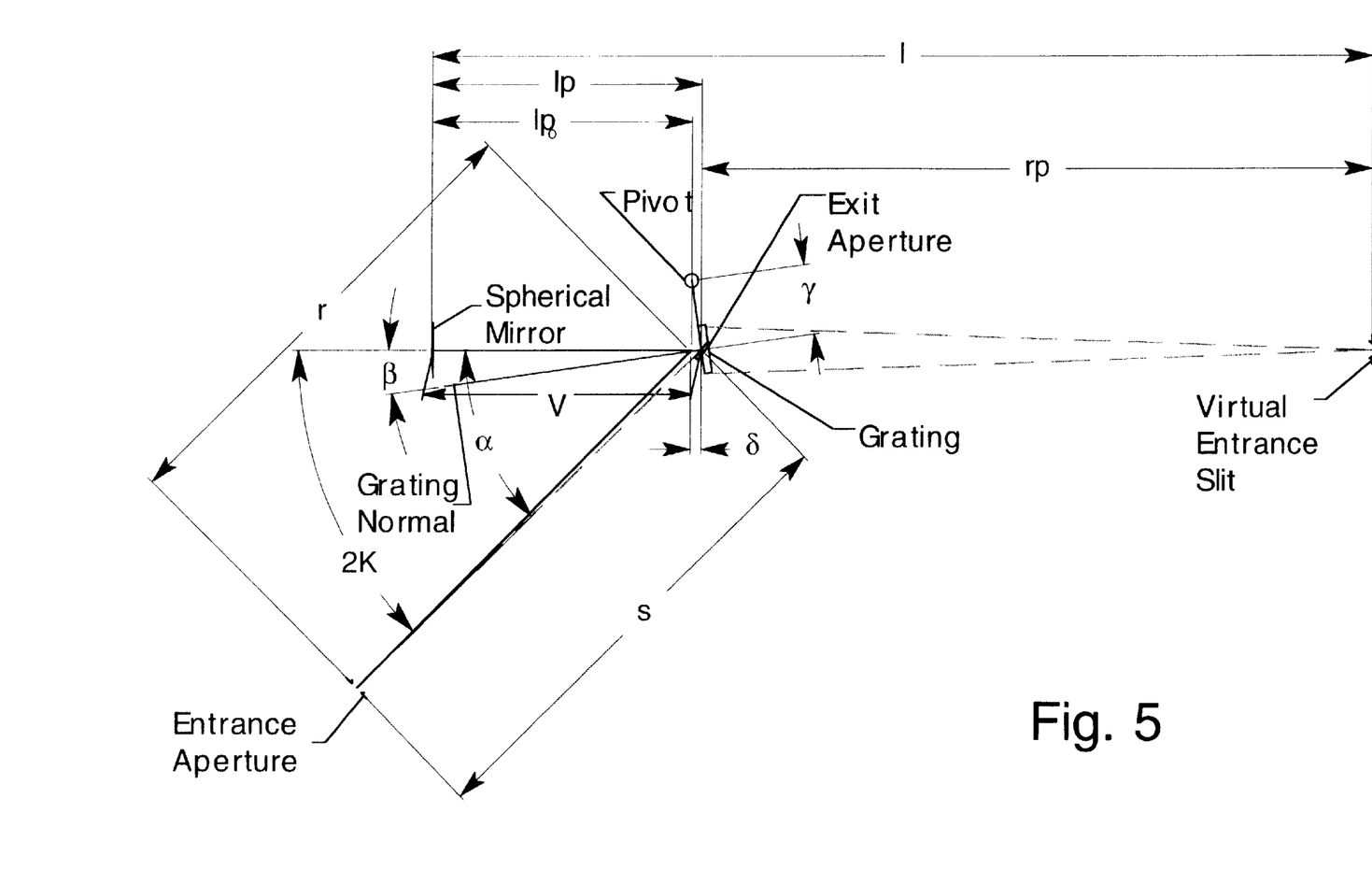
FIG. 5 is a schematic diagram labeled with the angles and distances contained in a mathematical exposition of the operation of the spectrophotometer system provided by the invention which shows that a distance between the pivot axis and the grating in a system having the advantages of the invention may be about 15 millimeters as compared to the 20 centimeters of the system in the above-referenced Schroeder article.

Referred to FIG. 5 there is defined a number of distances and angles which will show that the distance between the pivot and the center of the exit slit may be quite small and yet overcome longitudinal chromatic aberration. Consider the basic grating equation (1):

$$\lambda := \frac{d}{m} \cdot (\sin(\alpha) + \sin(\beta)) \tag{1}$$

Where $\lambda$ is wavelength in nm, d is the groove spacing of the grating in nm, m is the order number, $\alpha$ is the angle of incidence, and $\beta$ is the angle of diffraction. When considering a grating illuminated by diverging light it becomes necessary to consider the location of the virtual entrance slit. This location becomes dependant on $\alpha$ and $\beta$. The distance from the grating to the virtual entrance slit is $$rp := \frac{r \cdot \cos(\beta)^2}{\cos(\alpha)^2} \tag{2}$$

Where r is the distance from the real entrance slit to the grating. This effect is known as the focal curve. As noted above compensating for the focal curve in order to keep the entrance slit properly imaged on the exit slit was proposed by Schroeder. Schroeder proposed to offset the pivot, on which the grating rotated, from the center of the grating to a distance away. This would then translate the grating while rotating it. The translation would then keep the virtual entrance slit at a fixed point in space while the grating rotated.

A problem with Schroeders proposal arises when trying to make a compact instrument. For typical values of d, $\alpha$, $\beta$, and r the distance from the center of the pivot to the center of the grating needs to be on the order of 20 cm. The system provided by the invention is more compact and space efficient than without increasing mechanical complexity.

In the improved spectrophotometer the exit slit is mounted with the grating, thereby compensating for the focal curve with a much shorter pivot offset. The geometry of the improved spectrophotometer can be characterized by the location of the exit slit such that a single line drawn parallel to and through the center groove of the grating and continued passed the edge of the grating and through and parallel to the center of the exit slit. In this configuration the virtual entrance slit is no longer be held at a fixed point. Instead the exit slit can move so that its position would always be in the focal plane of the projected image.

By starting with a constant deviation angle of 2 K degrees the following equations can be derived $$\delta := -\gamma \cdot \sin(\beta) \tag{3}$$

$$\alpha := a\tan\left(\frac{r \cdot \sin(2 \cdot K)}{r \cdot \cos(2 \cdot K) + \delta}\right) + \beta \tag{4}$$

Where $\delta$ is the distance traveled by the grating, and exit slit, $\gamma$ is the distance from the center of the pivot to the center of the grating face and exit slit. The latter equation shows the dependance of the angle of incidence on grating position. Due to the change in position of the grating the distance from the entrance slit to the grating must also be considered.

$$s := \frac{r \cdot \cos(2 \cdot k) + \delta}{\cos(\alpha - \beta)} \tag{5}$$

where s is the distance from the real entrance slit to the grating. This alters the previous equation for rp to $$rp := \frac{s \cdot \cos(\beta)^2}{\cos(\alpha)^2} \tag{6}$$

The simple lens equation can be applied to now calculate the virtual entrance slit position.

$$fl := \frac{v \cdot l}{v + l} \tag{7}$$

where fl is the focal length of the spherical mirror, v is the distance from the spherical mirror to the exit slit, and l is the distance from the virtual entrance slit to the spherical mirror. The parameters v and l can be found from the following equations $$v := \left(\frac{lp_o + \delta}{\cos(\psi)}\right) \tag{8}$$

$$lp := lp_o + \delta \tag{9}$$

$$l := lp + rp \tag{10}$$

where $lp_o$ is the distance from the grating to the spherical mirror when $\alpha$ is 2 K deg and $\beta$ is 0 deg. $\Psi$ is the angle between the optic axis from the grating to the spherical mirror, and the optic axis from the spherical mirror to the exit slit. By substituting these values for $\alpha$ and $\beta$ into the above equations and selecting appropriate values for the fixed parameters, the focal length can be easily solved for. The pivot distance, γ can then be found by substituting the appropriate values in the above equations. It must be noted that this solution will give a minor amount of defocus as the grating is rotated away from its initial 2 K/0 geometry. However in a 10 nm bandwidth instrument this defocus is negligible. The focal length can be shifted slightly to minimise the maximun defocus. This introduces a small amount of defocus at the β equals 0 case but minimises overall defocus.

Figure 6:
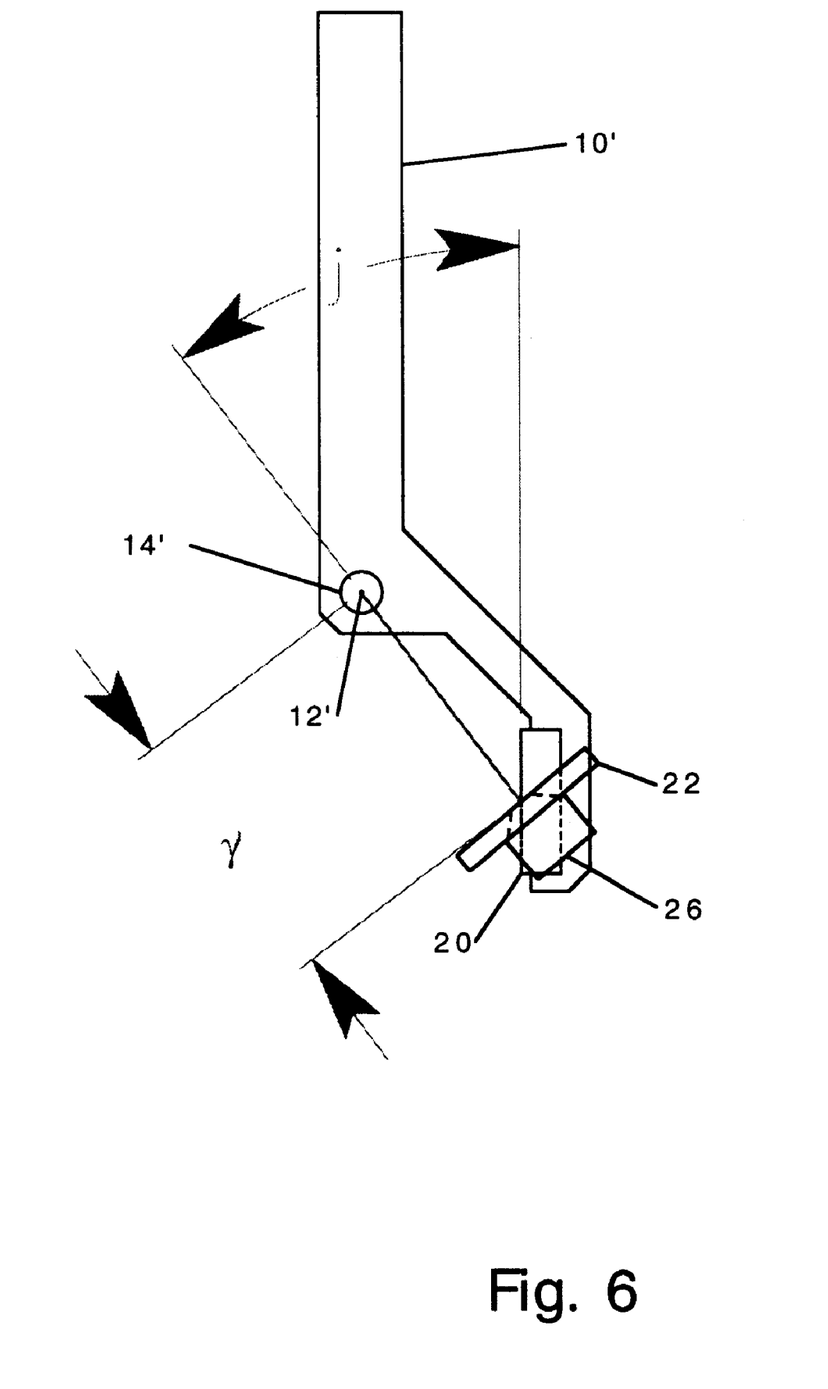
FIG. 6 is a plan view of a pivotal arm on which the grating is mounted, together with the exit aperture, to obtain even less longitudinal chromatic aberration than with the arrangement of FIGS. 1–3, in accordance with another embodiment of the invention.

If better focus throughout the wavelength range is desired, and yet a simple mechanical system is needed, this can be acomplished by offsetting the pivot from the position described above (see FIG. 6) in a direction orthogonal to the direction of the first offset mentioned. That is to say that the pivot arm will have a center of rotation removed from the center of the grating along both of the axes contained in the tangential plane. This will change equation (3) above to $$\delta := \gamma \cdot [\sin(j \cdot deg) - \sin[(j + \beta) \cdot deg]] \tag{11}$$

where j is the angle formed by the face of the grating and a line drawn from the center of the pivot to the center of the grating face. γ is still defined as the distance from the center of the pivot to the center of the grating face. The values for j, γ, fl, and $lp_o$ can now be optimised to minimise defocus across a selected wavelength range.

Now the size of the exit aperture must be considered.

$$Wp := w \cdot \frac{\cos(\beta \cdot deg)}{\cos(\alpha \cdot deg)} \tag{12}$$

$$Wpp := Wp \cdot \frac{lp}{l} \tag{13}$$

where w is the entrance slit width, Wp is the virtual entrance slit width and Wpp is the projected entrance slit width onto the exit slit.

It can now be noted that the image of the entrance slit will change in size as the grating is rotated about its off center axis. This too can be compensated for inorder to maintain triangular bandwidth in the instrument. With the exit slit mounted on the grating, it can be oriented such that its projection along the optic axis will match the image of the projected entrance slit for all α and β in a given wavelength range. By calculating the projected image size at the ends of its intended travel, and the change in β over this range the correct dimension and orientaions relative to the grating face can be determined.

$$\theta := \phi + (\beta_1 - \beta_2) \tag{14}$$

$$X := \frac{Wpp_1}{\cos(\theta)} \tag{15}$$

$$X := \frac{Wpp_2}{\cos(\phi)} \tag{16}$$

where θ and ψ are the angles of the normal of the exit slit to the optic axis corresponding to the grating angles $\beta_1$ and $\beta_2$ respectively. Wpp1 and Wpp2 being the projected image size of the entrance slit for each of the cases respectively. X is the real exit slit width.

These three equations with three unknowns can be solved by normal algebreic means.

To give an example of this system some parameters must be chosen. For this we will choose.

$$r := 160 \quad lp_o := 60 \quad w := 2.7 \quad d := 833.333 \quad d\lambda := 10 \quad m := 1$$

$$\Psi = 10$$

The wavelength range will be from 380 nm to 730 nm. Then solving for fl will give 51.82 mm. From here the value for γ that will work best will be found to be 16.2 mm.

Now solving for $\beta_1$ and $\beta_2$ gives $$\beta_1 := 5.64 \quad \beta_2 := -7.955$$

And therefore the results for the exit slit and size are $$\theta := 48.166 \quad \phi := 34.571 \quad X := .804 \text{ mm}$$

From the foregoing description, it will be apparent that there has been provided an improved spectrophotometer system which may be designed for portable and hand-held operation because of its adaptability to miniaturization. In addition, favorable optical characteristics which will improve the accuracy of the spectral measurements and compensate for distortion are also provided for in the herein described spectrophotometer. Of course, variations and modifications in the herein described spectrophotometer system may be made within the scope of the invention. Therefore, the foregoing description should be taken as an illustrative and not in a limiting sense.

I claim:

1. A spectrophotometer system having an entrance aperture for light to be spectrally analyzed over a wavelength range by the system, and having an exit aperture, a rotatable diffraction grating having an axis about which said grating rotates, a plate defining said exit aperture directly connected to and rotatable with the grating said exit aperture being displaced from said grating generally along said axis, and optics in a path between said entrance aperture and said exit aperture, said optics having such magnification that the anamorphic magnification of said grating and said optics is less than one.

2. The system according to claim 1 wherein said grating rotation is about a pivot displaced from said grating in a plane transverse to the displacement of said exit aperture.

3. The system according to claim 2 wherein said exit aperture is tilted with respect to said grating or a refractive element is disposed to intercept light incident on said exit aperture, in either case, said aperture having such tilt or said element tilting said light by refraction to maintain triangular bandwidth in said system approximately constant over the wavelength range.

4. The system of claim 2 further comprising means for maintaining triangular bandwidth in said system approximately constant over the wavelength range.

5. The system according to claim 1 wherein said exit aperture is an exit slit and the grating has a series of parallel grooves, one of which is generally central of the grating and said spectrophotometer system has a geometry characterized by the location of the exit slit such that a single line drawn parallel to and through the center groove of said grating and continued past the edge of the grating passes through and is parallel to the center of the exit slit.

6. The system according to claim 5 wherein said exit aperture is also a slit across the width of which said exit slit successive spectral portions.

7. The system according to claim 1 wherein said grating is on an arm rotatable in a tangential plane and said exit aperture is displaced in a sagittal plane.

8. The system according to claim 1 wherein the grating pivots on an arm and has a center adjacent a centrally defined groove of the grating said center and said pivot being displaced in accordance with equation $$\delta := \gamma \cdot [\sin(j \cdot \deg) - \sin[(j+\beta) \cdot \deg]]$$

where $\delta$ is the distance traveled by the grating $\gamma$ is the distance from the center of the pivot to the center of the face of the grating j is the angle formed by the face of the grating and a line drawn from the center of pivot to the center of the face of the grating $\beta$ is the angle of diffraction.

9. The system according to claim 8 wherein the width of the exit slit is defined by equations $$Wpp := Wp \cdot \frac{lp}{l}$$

wherein

Wpp is projected entrance slit width onto the exit slit

Wp is virtual entrance slit width l is the distance from the virtual entrance slit to a spherical mirror lp is the distance from the grating to the spherical mirror plus $\delta$ the distance traveled by the grating and $$\theta := \psi + (\beta_1 - \beta_2)$$

where $\theta$ and $\psi$ are the angles of the normal of the exit slit to an optic axis $\beta_1$ and $\beta_2$ are grating angles.

10. The system according to claim 7 further comprising a prism carried by said arm in light transmitting relationship with said grating.

* * * * *